US011635041B2

(12) United States Patent
Yamaguchi et al.

(10) Patent No.: US 11,635,041 B2
(45) Date of Patent: Apr. 25, 2023

(54) ENGINE (71) Applicant: Mazda Motor Corporation, Hiroshima (JP)

(72) Inventors: Naohiro Yamaguchi, Aki-gun (JP); Mitsunori Wasada, Aki-gun (JP); Satoshi Imamura, Aki-gun (JP); Toshimasa Kotani, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/649,488

(22) Filed: Jan. 31, 2022

(65) Prior Publication Data

US 2022/0282686 A1 Sep. 8, 2022

(30) Foreign Application Priority Data

Mar. 8, 2021 (JP) .............................. JP2021-036158

(51) Int. Cl.
| | |
|---|---|
| *F02F 1/42* | (2006.01) |
| *F02B 75/20* | (2006.01) |
| *F04D 17/10* | (2006.01) |
| *F04D 29/42* | (2006.01) |
| *F02B 75/18* | (2006.01) |

(52) U.S. Cl.
CPC ............ *F02F 1/4264* (2013.01); *F02B 75/20* (2013.01); *F04D 17/10* (2013.01); *F04D 29/4206* (2013.01); *F02B 2075/1824* (2013.01)

(58) Field of Classification Search
CPC ......... F02F 1/4264; F02F 1/243; F01L 13/00; F01L 2800/10; F02B 75/20; F02B 2075/1824; F02B 37/00; F04D 17/10; F04D 29/4206; F02D 41/0007; F02M 26/04; F02M 26/05; F02M 35/10157; Y02T 10/12

See application file for complete search history.

(56) References Cited

U.S. PATENT DOCUMENTS 2,654,991 A  * 10/1953  Nettel .................... F02B 37/11
                                                                 60/606
3,877,230 A  *  4/1975  Overy ................... F02B 37/166
                                                                 60/606

(Continued)

FOREIGN PATENT DOCUMENTS

JP         2008088861 A    4/2008

*Primary Examiner* — Grant Moubry
(74) *Attorney, Agent, or Firm* — Alleman Hall Creasman & Tuttle LLP (57) ABSTRACT

An engine is provided, which includes an engine body including a plurality of cylinders, each of the cylinders being provided with an intake port, an exhaust port, an intake valve, and an exhaust valve, an intake passage and an exhaust passage connected to the engine body, and a turbocharger including a turbine provided to the exhaust passage and a compressor provided to the intake passage. A geometric compression ratio of the cylinder is 11:1 or higher. An open period of the intake valve is a range of 270° or larger by a crank angle. The exhaust passage includes a plurality of independent exhaust passages, each communicating with the exhaust port of one cylinder or with the exhaust ports of two or more cylinders of which timings of exhaust strokes are discontinuous from each other, and connecting the engine body to the turbine.

9 Claims, 6 Drawing Sheets

(56) References Cited

U.S. PATENT DOCUMENTS

| | | | | |
|---|---|---|---|---|
| 5,020,327 | A | * | 6/1991 | Tashima .................. F02B 37/18 |
| | | | | 60/600 |
| RE42,875 | E | * | 11/2011 | Fischer .................. F02B 39/10 |
| | | | | 60/606 |
| 10,352,225 | B2 | * | 7/2019 | Takita .................... F01N 11/005 |
| 2005/0241613 | A1 | * | 11/2005 | Weber ..................... F01N 3/103 |
| | | | | 123/316 |
| 2010/0126153 | A1 | * | 5/2010 | Nagafuchi ............ F02F 1/4264 |
| | | | | 60/299 |
| 2014/0298804 | A1 | * | 10/2014 | Brinkert ................ F02B 37/007 |
| | | | | 60/605.2 |
| 2017/0067423 | A1 | * | 3/2017 | Beazley ........... F02M 35/10255 |
| 2019/0078498 | A1 | * | 3/2019 | Bedogni .............. F02B 19/1023 |
| 2019/0301346 | A1 | * | 10/2019 | Gawell ................. F02B 37/001 |

* cited by examiner

ENGINE

TECHNICAL FIELD

The present disclosure relates to an engine provided with an engine body including a plurality of cylinders, an intake passage and an exhaust passage connected to the engine body, and a turbocharger including a turbine provided to the exhaust passage and a compressor provided to the intake passage. The engine body includes an intake port, an exhaust port, an intake valve, and an exhaust valve, which are provided to each of the cylinders.

BACKGROUND OF THE DISCLOSURE

In engines mounted on, for example, automobiles, a turbocharger is provided to boost intake air in order to improve the output performance. Further, it is also known to increase the thermal efficiency of the engine by setting a geometric compression ratio of a cylinder higher so that the fuel efficiency of the engine is improved. For example, JP2008-088861A discloses an engine in which the geometric compression ratio of a cylinder is 14:1 or higher.

It is considered that, when a turbocharger is provided to an engine with a comparatively high geometric compression ratio of a cylinder, the fuel efficiency can be improved while the engine output is increased. However, when this configuration is simply adopted, preignition in which a mixture gas combusts at a timing earlier than an intended timing may occur.

For example, when the load of the engine is high and the temperature inside the cylinder is high, and intake gas which was increased in the temperature and pressure as a result of boosting by the turbocharger, is excessively compressed inside the cylinder, the in-cylinder temperature locally becomes high and the mixture gas may self-ignite at an early timing.

SUMMARY OF THE DISCLOSURE

The present disclosure is made in view of the above situations, and one purpose thereof is to provide an engine, capable of suppressing an occurrence of preignition while increasing fuel efficiency.

According to one aspect of the present disclosure, an engine is provided, which includes an engine body including a plurality of cylinders, each of the cylinders being provided with an intake port, an exhaust port, an intake valve, and an exhaust valve, an intake passage and an exhaust passage connected to the engine body, and a turbocharger including a turbine provided to the exhaust passage and a compressor provided to the intake passage. A geometric compression ratio of the cylinder is 11:1 or higher. An open period of the intake valve is a range of 270° or larger in crank angle. The exhaust passage includes a plurality of independent exhaust passages, each communicating with the exhaust port of one cylinder or the exhaust ports of two or more cylinders of which timings of exhaust strokes are discontinuous from each other, and each connecting the engine body to the turbine.

According to this structure, since the geometric compression ratio of each cylinder is set to be high (11:1 or higher), and the turbocharger is provided to the engine, fuel efficiency is improved while increasing the output of the engine. In addition, the open period of the intake valve is set to be long (the range of 270° or larger in crank angle), and part of the exhaust passage at which the engine body and the turbine are connected is configured by the plurality of independent exhaust passages, each communicating with the exhaust port of one cylinder or the exhaust ports of two or more cylinders of which the timings of exhaust strokes are discontinuous from each other, and thus, it becomes possible to suppress the occurrence of preignition.

Specifically, since the open period of the intake valve is set to the range of 270° or larger in crank angle, the open timing of the intake valve can be maintained at near an exhaust top dead center while a close timing of the intake valve is sufficiently retarded. When retarding the close timing of the intake valve, the effective compression ratio of the cylinder is lowered so that a mixture gas inside the cylinder is prevented from being excessively compressed. Moreover, when maintaining the open timing of the intake valve at near the exhaust top dead center, an overlap period during which the intake valve and the exhaust valve are both open for a given period is established so that scavenging performance of the cylinder is improved. When the scavenging performance of the cylinder is high, an amount of burnt gas at a high temperature remaining in the cylinder is reduced so that the in-cylinder temperature is kept low. Furthermore, when the part at which the engine body and the turbine are connected is configured as described above, exhaust interference between the independent exhaust passages (i.e., between the cylinders where exhaust strokes take place consecutively) can be suppressed. Accordingly, the amount of burnt gas remaining inside the cylinder is reduced certainly so that the in-cylinder temperature is certainly kept at low. In this manner, excessive compression of the mixture gas inside the cylinder is prevented and the in-cylinder temperature can securely be kept low. Therefore, with the configuration of setting the geometric compression ratio of each cylinder at 11:1 or higher and being provided with the turbocharger, fuel efficiency is improved and the occurrence of preignition can be suppressed.

The turbine may include a turbine body having a plurality of blades configured to rotate by receiving exhaust energy, and a turbine housing configured to accommodate the turbine body. An internal space of the turbine housing may be partitioned, at a part from an upstream end of the turbine housing to the turbine body, into a plurality of inlet passages lined up in a direction of a rotation axis of the turbine body and formed to extend along an outer circumference of the turbine body. The plurality of independent exhaust passages may be connected to different inlet passages, respectively.

According to this structure, each of the independent exhaust passages is independently connected to the inlet passage different from each other so that exhaust gas discharged from the cylinders in which exhaust strokes take place consecutively are flowed dividedly to the turbine body. Therefore, the exhaust interference between the cylinders and the occurrence of preignition can be suppressed further certainly.

The engine body may be formed with a plurality of in-head exhaust passages each communicating with the exhaust ports of the two or more cylinders of which the timings of exhaust strokes are discontinuous from each other. The plurality of independent exhaust passages may be connected to different in-head exhaust passages, respectively.

According to this structure, the flow passage for exhaust gas from the cylinders to the turbine can be made shorter. Thus, the turbine is efficiently driven by being applied with high exhaust energy, and therefore, the fuel efficiency is further improved as well as the engine being reduced in size.

The open period of each intake valve may be a range of 270° or larger and 290° or smaller in crank angle.

The engine may be a straight-six engine having six cylinders lined up in a row.

An upstream part of the exhaust passage may be branched into a first independent exhaust passage and a second independent exhaust passage, and a cylinder head may be formed with a first in-head exhaust passage and a second in-head exhaust passage each extending in a lined-up direction of the cylinders. When the six cylinders include a first cylinder, a second cylinder, a third cylinder, a fourth cylinder, a fifth cylinder, and a sixth cylinder in this order from a first side to a second side in the lined-up direction, the first in-head exhaust passage may communicate with the exhaust ports of the first cylinder, the second cylinder, and the third cylinder located on the first side in the lined-up direction, and the exhaust ports of the first, the second, and the third cylinders may be collected at the first in-head exhaust passage to be connected to the first independent exhaust passage. The second in-head exhaust passage may communicate with the exhaust ports of the fourth cylinder, the fifth cylinder, and the sixth cylinder located on the second side, and the exhaust ports of the fourth, the fifth, and the sixth cylinders may be collected at the second in-head exhaust passage to be connected to the second independent exhaust passage.

The turbine may be a twin-scroll turbine to which the first independent exhaust passage and the second independent exhaust passage are independently connected. The turbocharger may be provided with a first inlet passage provided on the first side in a direction of a rotation axis of the turbine, and a second inlet passage provided on the second side. The first independent exhaust passage may be connected to the first inlet passage, and the second independent exhaust passage may be connected to the second inlet passage.

DETAILED DESCRIPTION OF THE DISCLOSURE

Hereinafter, one preferable embodiment of the present disclosure is described in detail with reference to the accompanying drawings.

(Overall Configuration of Engine)

Figure 1:
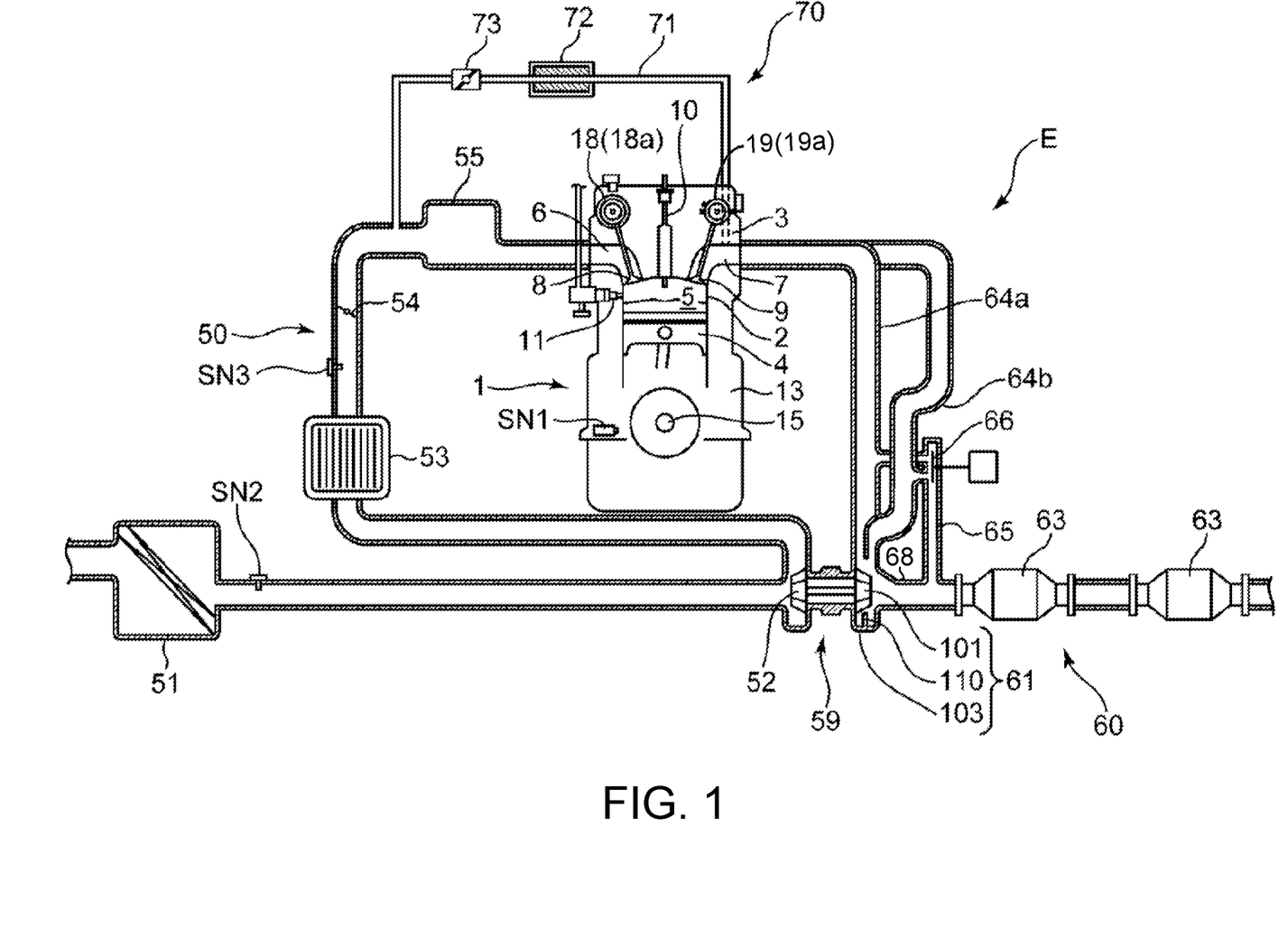
FIG. 1 is a schematic configuration diagram illustrating an engine according to one embodiment of the present disclosure.
Figure 2:
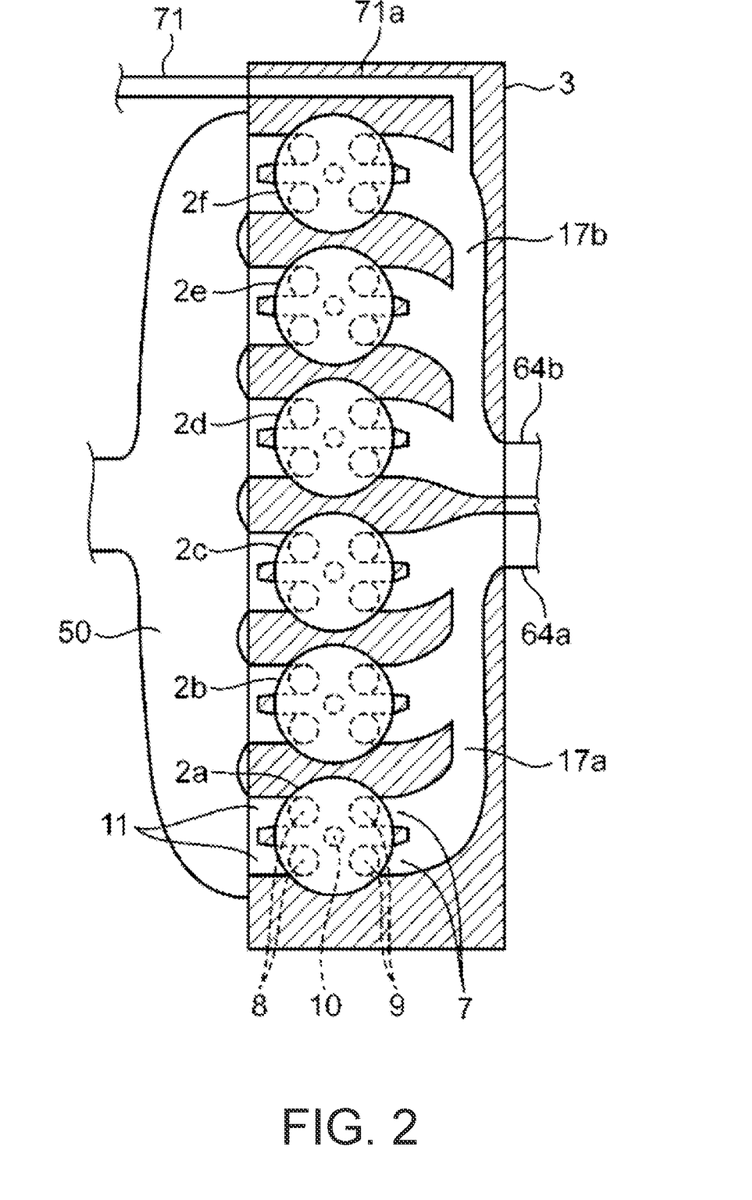
FIG. 2 is a schematic cross-sectional view of a cylinder head.

FIG. 1 is a schematic configuration diagram illustrating an engine E according to one embodiment of the present disclosure. Note that FIG. 1 is a schematic view which illustrates the configuration of the engine E, and the length of each passage and an arrangement of each device are different from the actual configuration. FIG. 2 is a schematic cross-sectional view of a cylinder head 3 (described later). The engine E is provided with a four-stroke engine body 1, an intake passage 50 through which air (intake air) to be introduced into the engine body 1 passes, and an exhaust passage 60 through which exhaust gas discharged from the engine body 1 passes. The engine E is a multi-cylinder engine having a plurality of cylinders 2 formed in the engine body 1. In this embodiment, as illustrated in FIG. 2, the engine body 1 is a straight-six engine having six cylinders 2 lined up in a row. The engine E is mounted on a vehicle, for example, as a drive source of the vehicle.

The engine E is a boosted engine having a turbocharger 59. The turbocharger 59 includes a turbine 61 provided to the exhaust passage 60 and a compressor 52 provided to the intake passage 50. The turbine 61 is rotary driven by exhaust gas, and rotary drives the compressor 52. When the compressor 52 is rotary driven, intake air inside the intake passage 50 is boosted. Note that FIG. 1 is a schematic view as described above, and the turbocharger 59 is disposed at a position near a side surface of the engine body 1.

The engine body 1 includes a cylinder block 13 in which the cylinders 2 are formed, the cylinder head 3 covering the cylinder block 13, and pistons 4 reciprocatably inserted into the respective cylinders 2. Each piston 4 is coupled to a crankshaft 15 via a connecting rod, and the crankshaft 15 rotates about its center axis according to the reciprocation of the piston 4. A combustion chamber 5 is defined above the piston 4.

A geometric compression ratio c of the cylinder 2 is a ratio of a volume V0 of the combustion chamber 5 when the piston 4 is at a top dead center (when located closest to the cylinder head 3), to a volume V1 of the combustion chamber 5 when the piston 4 is at a bottom dead center (when located farthest from the cylinder head 3) ($\varepsilon=V0/V1$), and is set to be 11:1 or higher. In this embodiment, the geometric compression ratio c of the cylinder 2 is set at 12:1.

An injector 11 which injects fuel into each combustion chamber 5 is attached to the cylinder block 13. To the cylinder head 3, a spark plug 10 which ignites a mixture gas (mixture gas of fuel and air) inside each combustion chamber 5 by spark discharge is attached. The cylinder head 3 is provided with an intake port 6 which introduces air into the combustion chamber 5 of each cylinder 2, an intake valve 8 which opens and closes the intake port 6, an exhaust port 7 which discharges exhaust gas generated inside the combustion chamber 5 of each cylinder 2, and an exhaust valve 9 which opens and closes the exhaust port 7.

A valve mechanism 18 which drives the intake valve 8 is built-in with an intake S-VT 18a which is changeable of open and close timings of the intake valve 8. Similarly, a valve mechanism 19 for the exhaust valve 9 is built-in with an exhaust S-VT 19a which is changeable of open and close timings of the exhaust valve 9. The intake S-VT 18a (exhaust S-VT 19a) is a so-called variable phase mechanism, and changes an open timing IVO (EVO) and a close timing IVC (EVC) of the intake valve 8 (exhaust valve 9) simultaneously by the same amount. That is, the open timing IVO (EVO) and the close timing IVC (EVC) of the intake valve 8 (exhaust valve 9) are changed while a valve open period is maintained to be constant. In this embodiment, the open period of the intake valve 8 is maintained at 270° CA (Crank Angle), and the open period of the exhaust valve 9 is maintained at 250° CA.

The intake passage 50 is provided, in an order from upstream, with an air cleaner 51, the compressor 52, an intercooler 53, a throttle valve 54, and a surge tank 55. Air compressed by the compressor 52 and then cooled by the intercooler 53 is introduced into the combustion chamber 5. The throttle valve 54 is a valve which is openable and closable of the intake passage 50, and an amount of intake air passing through the intake passage 50 can be controlled according to an opening of the throttle valve 54.

The exhaust passage 60 is provided, in an order from upstream, with the turbine 61, and a catalytic converter 63 built-in with a catalyst (e.g., a three-way catalyst). Detailed structures of the turbine 61 and a flow passage for the exhaust gas from each cylinder 2 to the turbine 61 will be described later.

The exhaust passage 60 is provided with a bypass passage 65 for bypassing the turbine 61. A downstream end of the bypass passage 65 is connected to part of a downstream-side exhaust passage 68 between the turbine 61 and the catalytic converter 63. An upstream end of the bypass passage 65 is branched into two passages, and the branched passages are connected to two independent exhaust passages 64a and 64b (described later), respectively. The bypass passage 65 is provided with a wastegate valve 66 which opens and closes the bypass passage 65. In the example of FIG. 1, the branched passages are simultaneously opened and closed by a single wastegate valve 66.

The engine E is provided with an exhaust gas recirculation (EGR) device 70 which recirculates a part of exhaust gas to intake gas. The EGR device 70 includes an EGR passage 71 through which exhaust gas passes, an EGR cooler 72 which cools EGR gas passing through the EGR passage 71, and an EGR valve 73 which opens and closes the EGR passage 71. In this embodiment, as illustrated in FIG. 2, an in-head EGR passage 71a which constitutes an upstream-end part of the EGR passage 71 is formed in the cylinder head 3. This in-head EGR passage 71a is communicated with a passage which is a second in-head exhaust passage 17b (described later) formed in the cylinder head 3 and through which exhaust gas passes, and part of the exhaust gas passing through the second in-head exhaust passage 17b recirculates to the intake passage 50 as the EGR gas.

The engine E is provided with various sensors. For example, the cylinder block 13 is provided with a crank-angle sensor SN1 which detects a rotational angle of the crankshaft 15 (i.e., an engine speed). Moreover, at a part of the intake passage 50 between the air cleaner 51 and the compressor 52, an airflow sensor SN2 which detects a flow rate of intake air passing through this part to be introduced into each cylinder 2 is provided. Further, at a part of the intake passage 50 between the intercooler 53 and the throttle valve 54, and on the downstream side of the compressor 52, a boost-pressure sensor SN3 which detects the boost pressure (i.e., the pressure of intake air passing through this part) is provided.

Figure 3:
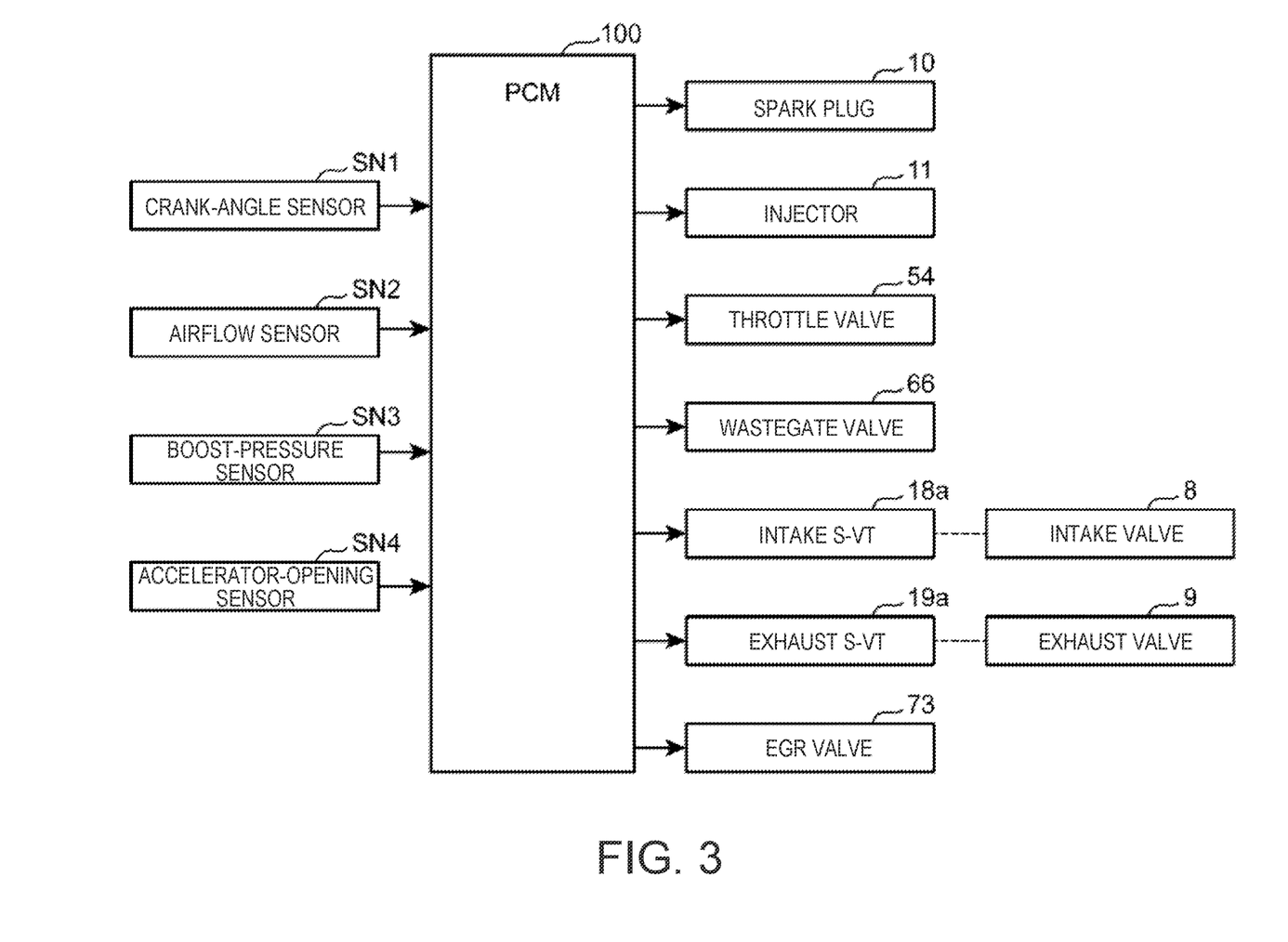
FIG. 3 is a block diagram illustrating a control system of the engine.

Each actuator of the engine E configured as described above is controlled by a powertrain control module (PCM) 100. FIG. 3 is a block diagram illustrating a control system of the engine E. The PCM 100 illustrated in this diagram is a microcomputer which integrally controls the engine, etc., and is comprised of a well-known processor (e.g., a central processing unit (CPU)) and memory (e.g., ROM and/or RAM), etc.

The PCM 100 receives inputs of detection signals of the various sensors. For example, the PCM 100 is electrically connected to the crank-angle sensor SN1, the airflow sensor SN2, and the boost-pressure sensor SN3, and information detected by these sensors are sequentially inputted into the PCM 100. Further, the vehicle on which the engine E is mounted is provided with an accelerator-opening sensor SN4 which detects a depressed amount (position) of an accelerator pedal which is operated by a driver who drives the vehicle, and information detected by the accelerator-opening sensor SN4 is also sequentially inputted into the PCM 100.

The PCM 100 controls each part of the engine E while executing, for example, various determinations and calculations based on the information inputted from each sensor. In detail, the PCM 100 is electrically connected to, for example, the spark plug 10, the injector 11, the throttle valve 54, the wastegate valve 66 (described later), the intake S-VT 18a, the exhaust S-VT 19a, and the EGR valve 73, and outputs a control signal to each of the devices based on a result of the calculations, etc.

The PCM 100 controls the spark plug 10 to ignite the mixture gas at an ignition timing set for each operation condition, controls the injector 11 to inject fuel into the cylinder 2 based on setting for each operation condition, and controls the throttle valve 54 to introduce intake air into the cylinder 2 by an amount set for each operation condition. Further, the PCM 100 controls the opening of the wastegate valve 66 so that the boost pressure becomes a value set for each operation condition, and controls the EGR valve 73 so that an EGR rate inside the cylinder 2 becomes a value set for each operation condition. Moreover, the PCM 100 controls the intake S-VT 18a and the exhaust S-VT 19a so that the intake valve 8 and the exhaust valve 9 open and close at timings set for each operation condition, respectively.

Figure 6:
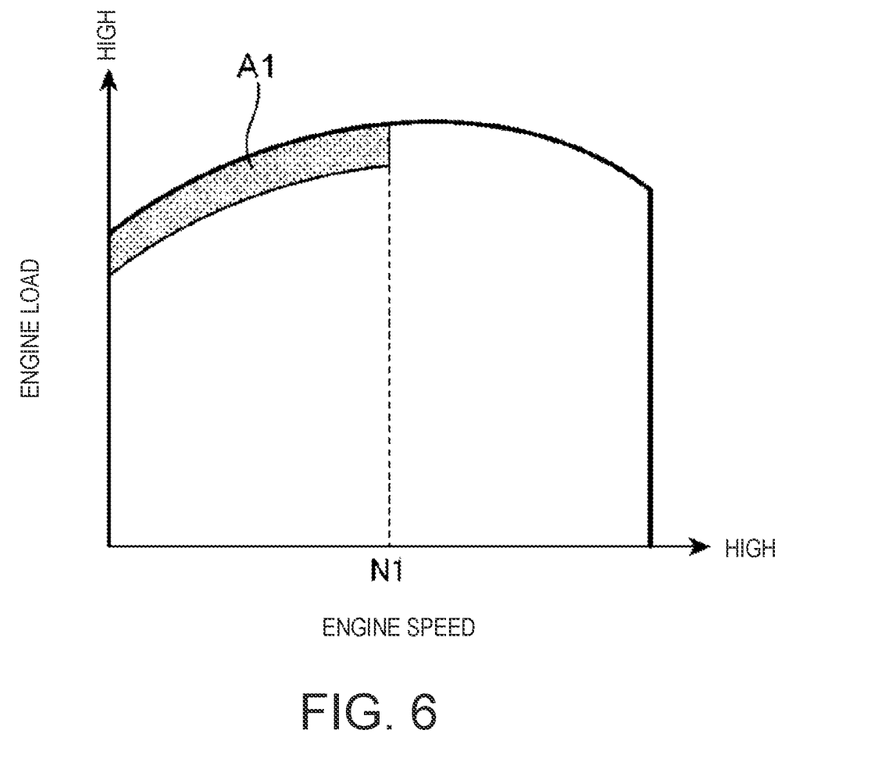
FIG. 6 is a map illustrating operation ranges of the engine.
Figure 7:
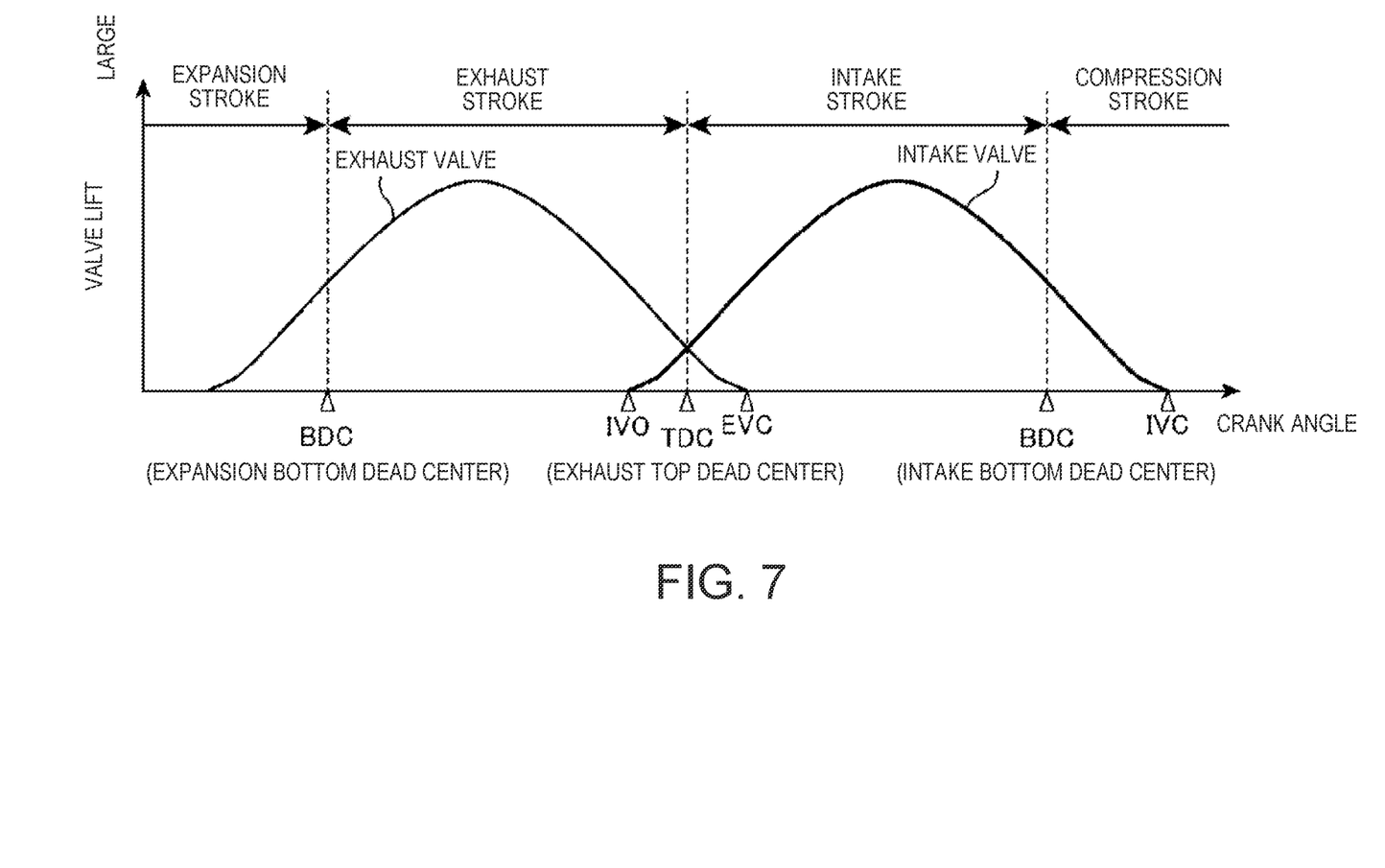
FIG. 7 is a view schematically illustrating valve lifts of an intake valve and an exhaust valve.

FIG. 6 is a map illustrating operation ranges of the engine, where the horizontal axis indicates the engine speed and the vertical axis indicates the engine load. FIG. 7 is a view schematically illustrating valve lifts of the intake valve 8 and the exhaust valve 9 in a low-speed and high-load range A1 illustrated in FIG. 6, where the engine speed is below a given reference speed N1, and the engine load is above a given reference load. The reference speed N1 is set to about 1,500 rpm, and the reference load is set to near the maximum value of the engine load (i.e., near the full load).

As illustrated in FIG. 7, in the low-speed and high-load range A1, the PCM 100 controls the intake S-VT 18a and the exhaust S-VT 19a to achieve a valve overlap during which the intake valve 8 and the exhaust valve 9 both open for a given period of time having an exhaust top dead center (TDC) therebetween. That is, the PCM 100 controls the intake S-VT 18a so that the open timing of the intake valve 8 (intake-valve open timing) IVO becomes an advanced timing from the exhaust TDC, and controls the exhaust S-VT 19a so that the close timing of the exhaust valve 9 (exhaust-valve close timing) EVC becomes a retarded timing from the exhaust TDC. For example, in the low-speed and high-load range A1, the intake-valve open timing IVO is set to about BTDC 25° CA (25° CA before the exhaust TDC), and the exhaust-valve close timing EVC is set to ATDC 25° CA (25° CA after the exhaust TDC). Therefore, the overlap period during which the intake valve 8 and the exhaust valve 9 are both open is a range of about 50° CA.

(Turbine 61 and Flow Passage for Exhaust Gas)

Figure 4:
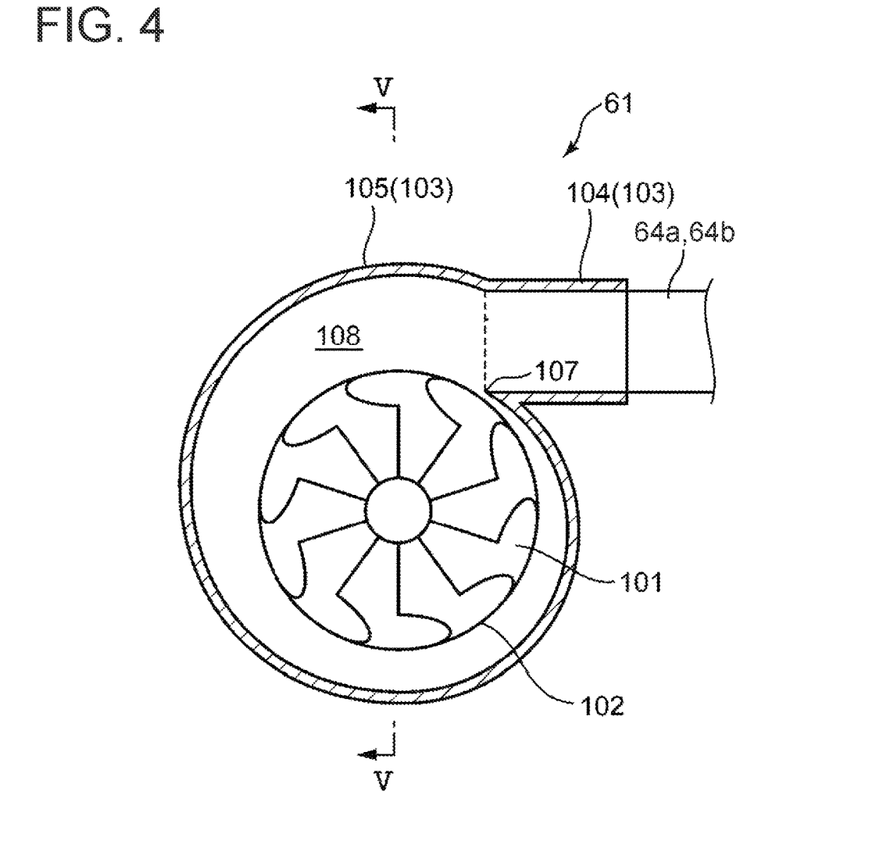
FIG. 4 is a schematic cross-sectional view of a turbine.
Figure 5:
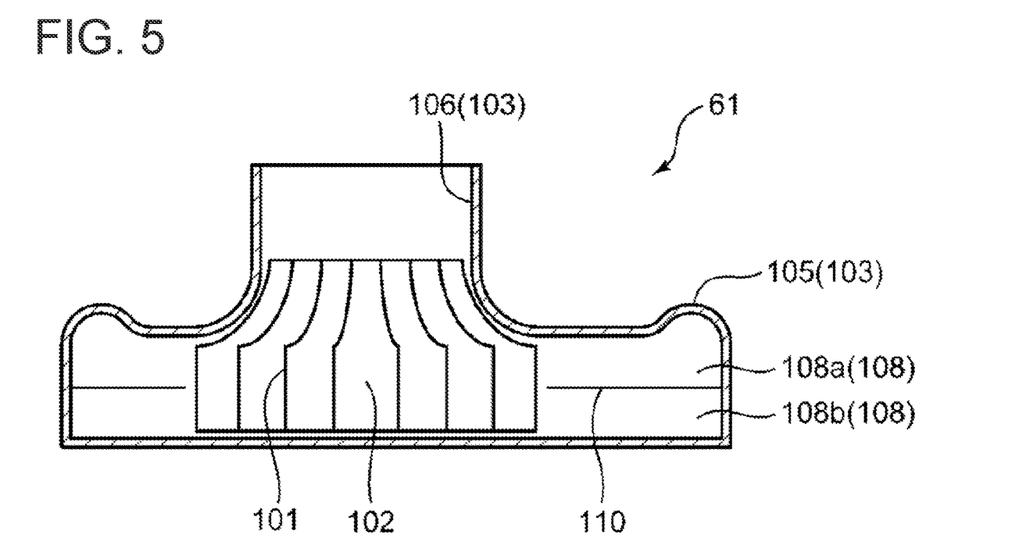
FIG. 5 is a cross-sectional view taken along a line V-V of FIG. 4.

Next, structures of the turbine 61 and the flow passage for exhaust gas from each cylinder 2 to the turbine 61 are described. FIG. 4 is a schematic cross-sectional view of the turbine 61 along a plane perpendicular to a rotation axis of the turbine 61. FIG. 5 is a schematic cross-sectional view taken along a line V-V of FIG. 4.

As illustrated in FIG. 1, in this embodiment, the upstream part of the exhaust passage 60 is branched into two passages, and the exhaust passage 60 includes the first independent exhaust passage 64a and the second independent exhaust passage 64b which constitute the upstream part. Exhaust gas discharged from the cylinders 2 of which timings of exhaust strokes are not continuous with each other, is introduced into each of the independent exhaust passages 64a and 64b. In this embodiment, the exhaust ports 7 of the cylinders 2 where exhaust strokes do not take place consecutively, are collected in the cylinder head 3, and each collected part is connected to the independent exhaust passage 64a or 64b.

For example, in the cylinder head 3, a first in-head exhaust passage 17a and the second in-head exhaust passage 17b each extending in the lined-up direction of the cylinders 2 are formed. Suppose that the six cylinders 2 are, from a first side in the lined-up direction, a first cylinder 2a, a second cylinder 2b, a third cylinder 2c, a fourth cylinder 2d, a fifth cylinder 2e, and a sixth cylinder 2f. The first in-head exhaust passage 17a is communicated with the exhaust ports 7 of the three cylinders 2 located on the first side in the lined-up direction of the cylinders 2 (i.e., the first cylinder 2a, the second cylinder 2b, and the third cylinder 2c), and the exhaust ports 7 of the cylinders 2a, 2b, and 2c are collected at the first in-head exhaust passage 17a. On the other hand, the second in-head exhaust passage 17b is communicated with the exhaust ports 7 of the three cylinders 2 located on a second side in the lined-up direction of the cylinders 2 (i.e., the fourth cylinder 2d, the fifth cylinder 2e, and the sixth cylinder 2f), and the exhaust ports 7 of the cylinders 2d, 2e, and 2f are collected at the second in-head exhaust passage 17b. Each of the first in-head exhaust passage 17a and the second in-head exhaust passage 17b individually opens to the side surface of the engine body 1. The first in-head exhaust passage 17a is connected to and communicated with the opening of the first independent exhaust passage 64a, and the second in-head exhaust passage 17b is connected to and communicated with the opening of the second independent exhaust passage 64b.

An order of ignitions in the six cylinders 2 (an order of combustions of the mixture gas inside the cylinders 2) is set to be the first cylinder 2a, the fifth cylinder 2e, the third cylinder 2c, the sixth cylinder 2f, the second cylinder 2b, and then the fourth cylinder 2d, and thus, exhaust strokes also take place consecutively in this order. Accordingly, the timings of exhaust strokes of the first cylinder 2a, the second cylinder 2b, and the third cylinder 2c which communicate with the first in-head exhaust passage 17a are discontinuous from each other, and exhaust gas discharged from the cylinders 2 where exhaust strokes do not take place consecutively (in other words, the timings of exhaust strokes are discontinuous from each other), is introduced into the first independent exhaust passage 64a. Similarly, the timings of exhaust strokes of the fourth cylinder 2d, the fifth cylinder 2e, and the sixth cylinder 2f are discontinuous from each other, and exhaust gas discharged from the cylinders 2 where exhaust strokes do not take place consecutively, is introduced into the second independent exhaust passage 64b.

The turbine 61 is a twin-scroll turbine, and the first independent exhaust passage 64a and the second independent exhaust passage 64b are independently connected to the turbine 61.

For example, the turbine 61 is a radial turbine, and includes a turbine body (i.e., a turbine impeller) 102 which has a plurality of blades 101 at its outer circumference and rotates by exhaust gas colliding with the blades 101, and a turbine housing 103 which accommodates the turbine body 102. The turbine housing 103 includes an inlet part 104 which inwardly introduces exhaust gas, a turbine scroll part 105 which extends along the outer circumference of the turbine body 102 from a downstream end of the inlet part 104, and surrounds the entire circumference of the turbine body 102, and an outlet part 106 which discharges the expanded exhaust gas in the turbine body 102 to the downstream side. The turbine scroll part 105 is provided, at its downstream end, with a tongue part 107 which projects toward the turbine body 102 and partitions the inlet part 104 from the downstream part of the turbine scroll part 105. The turbine scroll part 105 has a spiral shape, and a cross-sectional channel area thereof becomes smaller toward the tongue part 107 at the downstream side.

Inside a part of the turbine housing 103 comprised of the inlet part 104 and the turbine scroll part 105, a partition 110 is provided to be located at substantially the center of the turbine 61 in a direction of the rotation axis of the turbine 61 (turbine body 102) and extend along the outer circumference of the turbine housing 103. By the partition 110, a part of the turbine housing 103 comprised of the inlet part 104 and the turbine scroll part 105 (i.e., an internal space from the upstream end of the turbine housing 103 to the turbine body 102 in the flowing direction of the exhaust gas) is partitioned into two inlet passages 108 aligned in the rotation-axis direction of the turbine 61 (turbine body 102) and each extending along the outer circumference of the turbine body 102. That is, the internal space is provided with a first inlet passage 108a provided on a first side in the rotation-axis direction of the turbine 61, and a second inlet passage 108b provided on a second side. The inlet passages 108a and 108b are formed mutually independently over the substantially entire circumference of the turbine body 102.

The first independent exhaust passage 64a and the second independent exhaust passage 64b are connected to the two inlet passages 108a and 108b, respectively. That is, the first independent exhaust passage 64a is connected to the first inlet passage 108a, and the second independent exhaust passage 64b is connected to the second inlet passage 108b.

According to this configuration, between the two cylinders 2 where exhaust strokes are carried out consecutively, exhaust gas discharged from the two cylinders 2 passes through the mutually independent passages to reach the turbine body 102. Note that a sole downstream-side exhaust passage 68 which constitutes the downstream part of the exhaust passage 60 is connected to the outlet part 106 of the turbine 61, and the exhaust gas introduced into the turbine housing 103 from the independent exhaust passages 64a and 64b is introduced into the common downstream-side exhaust passage 68 after passing through the turbine body 102.

(Operation, etc.)

As described above, in the engine E according to this embodiment, the geometric compression ratio c of each cylinder 2 is set to be 12:1. Moreover, the turbocharger 59 is provided to the engine E to boost intake air. Therefore, the fuel efficiency is improved while increasing the output of the engine E.

However, when the geometric compression ratio c is set to be high at 12:1, and the turbocharger 59 is provided to boost intake air, preignition in which the mixture gas self-ignites at a timing earlier than the intended timing (in detail, earlier than the ignition timing by the spark plug 10) may be caused.

Here, as a configuration to prevent preignition, it is considered to set the intake-valve close timing IVC to a sufficiently retarded timing after an intake bottom dead center (BDC) so as to lower an effective compression ratio of the cylinder 2. However, when the intake-valve close timing IVC is retarded, the intake-valve open timing IVO is also retarded, and thus, the overlap period of the intake valve 8 and the exhaust valve 9 near the exhaust TDC becomes shorter. Then, when the overlap period of the intake valve 8 and the exhaust valve 9 becomes zero or excessively short, scavenging performance of the cylinder 2 degrades and an amount of burnt gas at a high temperature remaining in the cylinder 2 increases, which raises the temperature inside the cylinder 2, and thus, it becomes impossible to sufficiently suppress preignition.

On the other hand, in this embodiment, the open period of the intake valve 8 is set to be a long range of 270° CA. Therefore, while the intake-valve close timing IVC is retarded, the intake-valve open timing IVO can be prevented from being excessively retarded. That is, since the intake-valve open timing IVO is maintained at near the exhaust TDC, the overlap period of the intake valve 8 and the exhaust valve 9 can be secured. Therefore, while lowering the effective compression ratio, the degradation in the scavenging performance of the cylinder 2 can be prevented, and thus, the occurrence of preignition can be suppressed. For example, as described above, in the low-speed and high-load range A1 where preignition is likely to occur, while securing the sufficient overlap period of 50° CA by setting the exhaust-valve close timing EVC at ATDC 25° CA and setting the intake-valve open timing IVO at BTDC 25° CA, the intake-valve close timing IVC can sufficiently be retarded to ABDC 75° CA (75° CA after the intake BDC). As a result, the occurrence of preignition in the low-speed and high-load range A1 can be reduced.

Moreover, in this embodiment, the part of the exhaust passage 60 between the engine body 1 and the turbine 61 is comprised of the two independent exhaust passages (the first independent exhaust passage 64*a* and the second independent exhaust passage 64*b*). The first independent exhaust passage 64*a* communicates with the exhaust ports 7 of the first cylinder 2*a*, the second cylinder 2*b*, and the third cylinder 2*c* where exhaust strokes do not take place consecutively. The second independent exhaust passage 64*b* communicates with the exhaust ports 7 of the fourth cylinder 2*d*, the fifth cylinder 2*e*, and the sixth cylinder 2*f* where exhaust strokes do not take place consecutively. Therefore, an occurrence of exhaust interference can be suppressed (e.g., it is suppressed that exhaust gas discharged from a certain cylinder 2 enters into a cylinder 2 where exhaust stroke is carried out one before the certain cylinder 2, or exhaust gas discharged from the certain cylinder 2 disturbs discharging of exhaust gas from a cylinder 2 where exhaust stroke is carried out one after the certain cylinder 2). As a result, the remaining amount of burnt gas inside the cylinder 2 can be suppressed to be small, and preignition can be reduced certainly.

Particularly, in this embodiment, the internal space of the part of the turbine housing 103 from its upstream end to the turbine body 102 is partitioned into the two inlet passages 108 (108*a* and 108*b*) which are lined up in the rotation-axis direction of the turbine body 102, and the inlet passages 108 (108*a* and 108*b*) are configured to be independent from each other over the entire circumference of the turbine body 102. Further, the first independent exhaust passage 64*a* and the second independent exhaust passage 64*b* are independently connected to the inlet passages 108 (108*a* and 108*b*), respectively. Therefore, exhaust interference and preignition can be suppressed certainly.

In detail, the cross-sectional channel area of the turbine scroll part 105 which surrounds the turbine body 102 decreases toward the tongue part 107 at the downstream side. Therefore, a flow speed of exhaust gas introduced into the turbine scroll part 105 increases toward the tongue part 107 (i.e., the downstream end of the passage surrounding the turbine body 102), and the exhaust gas is discharged at a high speed to the turbine body 102 toward the downstream.

Therefore, as described above, since the two inlet passages 108 (108*a* and 108*b*) are independent from each other over the entire circumference of the turbine body 102, exhaust gas inside each inlet passage 108 (108*a* and 108*b*) is discharged at a high speed to the turbine body 102 toward the downstream. Thereby, it can certainly be prevented that exhaust gas which passed through one inlet passage 108*a* (108*b*) and one independent exhaust passage 64*a* (64*b*) connected thereto, enters into the other inlet passage 108*b* (108*a*) and the other independent exhaust passage 64*b* (64*a*) connected thereto (i.e., the occurrence of the exhaust interference can certainly be suppressed).

Furthermore, in this embodiment, the in-head exhaust passages 17*a* and 17*b* each communicating with the exhaust ports 7 of two or more cylinders 2 of which the timings of exhaust strokes are discontinuous from each other, are formed to be connected to the independent exhaust passages 64*a* and 64*b*, respectively. Therefore, the flow passage for exhaust gas from the cylinder 2 to the turbine 61 can be made shorter. For example, suppose that flow passages for exhaust gas discharged from the plurality of cylinders 2 are collected outside the cylinder head 3, it is required that each exhaust port 7 extends from the cylinder 2 to the side surface of the cylinder head 3 and opens at the side surface, and after the opening is independently connected to a passage, the plurality of passages are collected outside the cylinder head 3. Therefore, according to this embodiment, the exhaust gas flow passage can be made shorter compared to the supposed configuration, at least by the length inside the cylinder head 3 from the cylinder 2 to the side surface of the cylinder head 3.

Moreover, according to this configuration, since the exhaust gas flow passage from the cylinder 2 to the turbine 61 can be made shorter, the turbine 61 is efficiently driven by being applied with high exhaust energy, thus the fuel efficiency being improved, and also the size of the engine E can be reduced.

(Modifications)

Although in this embodiment the inlet passages 108 (108*a* and 108*b*) communicating with the independent exhaust passages 64*a* and 64*b*, respectively, are formed to extend over the entire circumference of the turbine body 102, the inlet passages 108 (108*a* and 108*b*) may not extend over the entire circumference of the turbine body 102. Further, the turbine 61 with the internal space not being partitioned into the plurality of passages may be used. Also according to this configuration, by the passage which introduces exhaust gas into the turbine 61 being comprised of a plurality of independent exhaust passages, and each independent exhaust passage being independently communicated with the exhaust ports 7 of the cylinders 2 where exhaust strokes are not carried out consecutively, exhaust interference between the cylinders 2 where exhaust strokes are carried out consecutively can be suppressed. However, as described above, if the internal space of the turbine housing 103 from the upstream end to the turbine body 102 is partitioned into the plurality of inlet passages extending over the entire circumference of the turbine body 102, exhaust interference can certainly be suppressed.

Although in this embodiment the in-head exhaust passages 17*a* and 17*b* are formed in the cylinder head 3, and the exhaust ports 7 of the cylinders 2 of which the timings of exhaust strokes are discontinuous from each other are merged inside the cylinder head 3, the exhaust ports 7 may be merged outside the cylinder head 3 and the engine body 1. However, as described above, if the exhaust ports 7 are merged inside the cylinder head 3, it becomes possible to further improve the fuel efficiency and reduce the size of the engine E.

Although in this embodiment the geometric compression ratio c of each cylinder 2 is 12:1, as described above, it is not limited to 12:1 as long as it is 11:1 or higher. That is, it has been apparent that preignition is likely to occur in the engine with the turbocharger when the geometric compression ratio c of the cylinder 2 is 11:1 or higher, and the effects described above can be achieved in the engine with the geometric compression ratio c at 11:1 or higher. Note that, from a viewpoint of practicality, an upper limit of the geometric compression ratio c of the cylinder 2 is preferably 20:1. That is, the geometric compression ratio c of the cylinder 2 is preferably 11:1 or higher and 20:1 or lower.

Moreover, although in this embodiment the open period of the intake valve 8 is the range of 270° CA, the valve open period may be any period as long as it is the range of 270° CA or larger. That is, if the open period of the intake valve 8 is the range of 270° CA or larger, in the engine with the turbocharger having the geometric compression ratio c of the cylinder 2 at 11:1 or higher, preignition can be prevented while the effective compression ratio of the cylinder 2 is reduced and the overlap period of the intake valve 8 and the exhaust valve 9 is secured. Note that, from a viewpoint of practicality (e.g., avoidance of interference between the intake valve 8 and the piston), an upper limit of the open period of the intake valve 8 is preferably a range of 290° CA. That is, the open period of the intake valve 8 is preferably the range of 270° CA or larger and 290° CA or smaller.

Moreover, although in this embodiment six cylinders 2 are formed in the engine body 1, the number of cylinders of the engine is not limited to this. Further, the number of the independent exhaust passages is not limited to two, but two or more independent exhaust passages may be provided depending on the number of cylinders. Further, the number of the inlet passages 108 provided to the turbine 61 is also not limited to two, but any number of the inlet passages 108 may be provided depending on the number of the independent exhaust passages. Furthermore, the independent exhaust passage is configured at least not to communicate with the exhaust ports of the cylinders of which the timings of exhaust strokes are continuous to each other, and for example, a given independent exhaust passage may communicate with only the exhaust port of one cylinder.

Moreover, the concrete values of the engine speed which defines the low-speed and high-load range A1, and the intake-valve open timing IVO and the exhaust-valve close timing EVC in the low-speed and high-load range A1, are not limited to those described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
2 Cylinder
3 Cylinder Head
7 Exhaust Port
8 Intake Valve
17a First In-head Exhaust Passage (In-head Exhaust Passage)
17b Second In-head Exhaust Passage (In-head Exhaust Passage)
59 Turbocharger (Booster)
60 Exhaust Passage
61 Turbine
64a First Independent Exhaust Passage (Independent Exhaust Passage)
64b Second Independent Exhaust Passage (Independent Exhaust Passage)
101 Blade
102 Turbine Body
103 Turbine Housing
105 Turbine Scroll Part
108 Inlet Passage
E Engine

What is claimed is:

1. An engine, comprising:
an engine body including a plurality of cylinders, each of the cylinders being provided with an intake port, an exhaust port, an intake valve, and an exhaust valve;
an intake passage and an exhaust passage connected to the engine body; and
a turbocharger including a turbine provided to the exhaust passage and a compressor provided to the intake passage,
wherein a geometric compression ratio of the cylinder is 11:1 or higher,
wherein an open period of each intake valve is a range of 270° or larger in crank angle,
wherein the exhaust passage includes a plurality of independent exhaust passages, each communicating with the exhaust port of one cylinder or the exhaust ports of two or more cylinders of which timings of exhaust stroke are discontinuous from each other, and each connecting the engine body to the turbine,
wherein the engine is a straight-six engine having six cylinders lined up in a row,
wherein an upstream part of the exhaust passage is branched into a first independent exhaust passage and a second independent exhaust passage, and a cylinder head is formed with a first in-head exhaust passage and a second in-head exhaust passage each extending in a lined-up direction of the cylinders, and
wherein, when the six cylinders include a first cylinder, a second cylinder, a third cylinder, a fourth cylinder, a fifth cylinder, and a sixth cylinder in this order from a first side to a second side in the lined-up direction, the first in-head exhaust passage communicates with the exhaust ports of the first cylinder, the second cylinder, and the third cylinder located on the first side in the lined-up direction, and the exhaust ports of the first, the second, and the third cylinders are collected at the first in-head exhaust passage to be connected to the first independent exhaust passage, and the second in-head exhaust passage communicates with the exhaust ports of the fourth cylinder, the fifth cylinder, and the sixth cylinder located on the second side, and the exhaust ports of the fourth, the fifth, and the sixth cylinders are collected at the second in-head exhaust passage to be connected to the second independent exhaust passage.

2. The engine of claim 1,
wherein the turbine includes a turbine body having a plurality of blades configured to rotate by receiving exhaust energy, and a turbine housing configured to accommodate the turbine body,
wherein an internal space of the turbine housing is partitioned, at a part from an upstream end of the turbine housing to the turbine body, into a plurality of inlet passages lined up in a direction of a rotation axis of the turbine body and formed to extend along an outer circumference of the turbine body, and wherein the plurality of independent exhaust passages are connected to different inlet passages, respectively.

3. The engine of claim 2, wherein the open period of each intake valve is a range of 270° or larger and 290° or smaller in crank angle.

4. The engine of claim 2, wherein the first in-head exhaust passage and the second in-head exhaust passage each communicates with the exhaust ports of the two or more cylinders of which the timings of exhaust strokes are discontinuous from each other, and wherein the plurality of independent exhaust passages are connected to different in-head exhaust passages, respectively.

5. The engine of claim 4, wherein the open period of each intake valve is a range of 270° or larger and 290° or smaller in crank angle.

6. The engine of claim 1, wherein the first in-head exhaust passage and the second in-head exhaust passage each communicates with the exhaust ports of the two or more cylinders of which the timings of exhaust strokes are discontinuous from each other, and wherein the plurality of independent exhaust passages are connected to different in-head exhaust passages, respectively.

7. The engine of claim 6, wherein the open period of each intake valve is a range of 270° or larger and 290° or smaller in crank angle.

8. The engine of claim 1, wherein the open period of each intake valve is a range of 270° or larger and 290° or smaller in crank angle.

9. The engine of claim 1, wherein the turbine is a twin-scroll turbine to which the first independent exhaust passage and the second independent exhaust passage are independently connected, wherein the turbocharger is provided with a first inlet passage provided on the first side in a direction of a rotation axis of the turbine, and a second inlet passage provided on the second side, and wherein the first independent exhaust passage is connected to the first inlet passage, and the second independent exhaust passage is connected to the second inlet passage.

* * * * *